J. H. SABO.
FOLDING FRUIT STAND.
APPLICATION FILED NOV. 3, 1908.
914,606.
Patented Mar. 9, 1909.
2 SHEETS—SHEET 2.
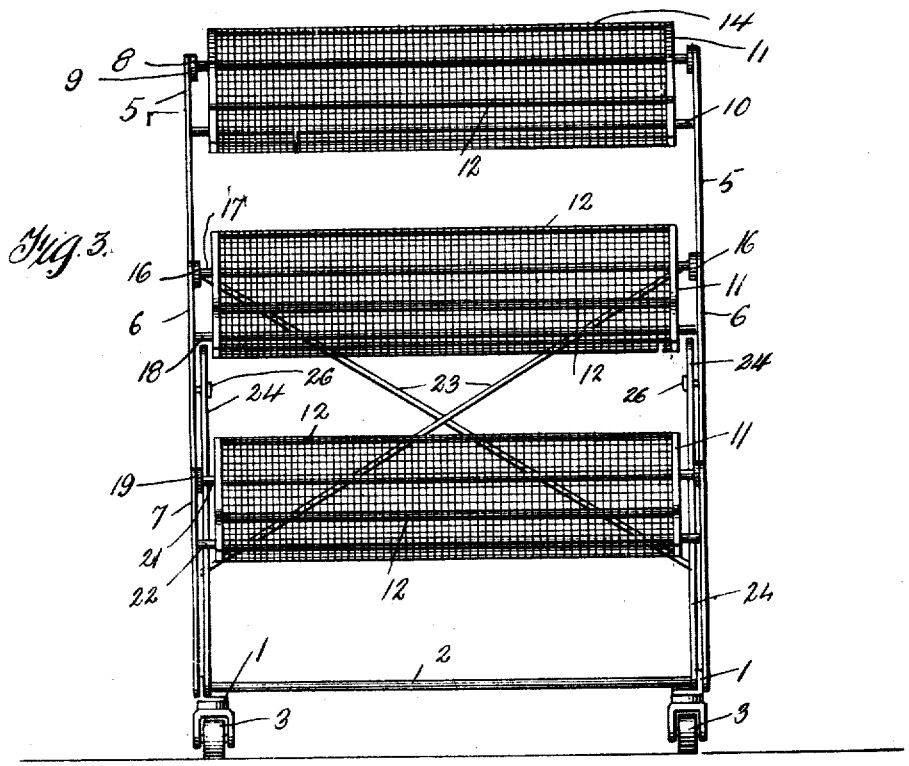
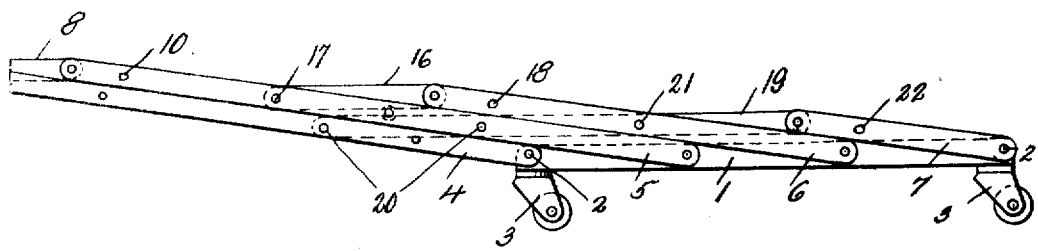
Witnesses
Samuel Payne
R. H. Butler
Inventor
J. H. Sabo.
By H. C. Everett & Co.
Attorneys

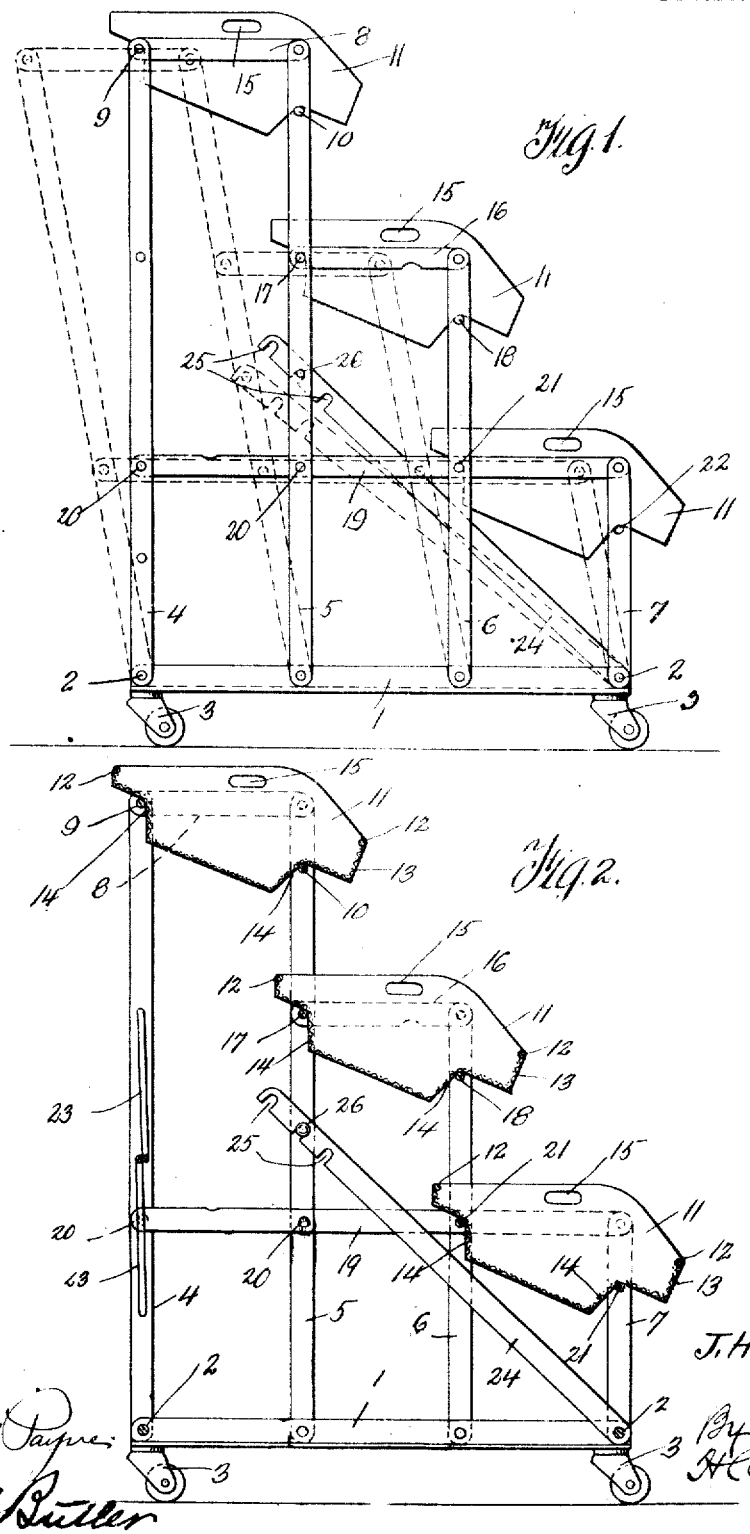

UNITED STATES PATENT OFFICE.

JOHN H. SABO, OF JOHNSTOWN, PENNSYLVANIA.

FOLDING FRUIT-STAND.

No. 914,606.                Specification of Letters Patent.         Patented March 9, 1909.

Application filed November 3, 1908. Serial No. 460,895.

*To all whom it may concern:*

Be it known that I, JOHN H. SABO, a citizen of the United States of America, residing at Johnstown, in the county of Cambria and State of Pennsylvania, have invented certain new and useful Improvements in Folding Fruit-Stands, of which the following is a specification, reference being had therein to the accompanying drawing.
This invention relates to a folding fruit stand, and the primary object of my invention is to provide a movable fruit stand that can be folded to occupy a comparatively small space when not in use.
Another object of this invention is to provide a fruit stand with portable fruit trays, permitting of fruit being easily arranged upon the stand and removed therefrom in bulk.
My invention aims to provide a fruit stand that can be used by merchants or venders of fruit upon the sidewalk and at night the fruit removed and the stand folded, whereby the stand will occupy comparatively small space within the store. I provide the stand with casters whereby it can be easily moved, and also provide means for adjusting the stand at different inclinations to permit of the stand being fitted in places which would not readily accommodate a non-adjustable stand.

The detail construction entering into my invention will be presently described and then specifically claimed.
Referring to the drawings:—Figure 1 is a side elevation of a stand constructed in accordance with my invention, illustrating an adjusted position of the same in dotted line, Fig. 2 is a vertical sectional view of the stand, Fig. 3 is a front elevation of the same, and Fig. 4 is a side elevation of a portion of the stand collapsed.

In the accompanying drawings, 1 designates two end base bars preferably of angle bar form and connected by longitudinal rods 2 and supported by revoluble casters 3. Pivotally connected to the end bars 1 are side uprights 4, 5, 6 and 7, the uprights 4 and 7 being pivotally mounted upon the rods 2, while the uprights 5 and 6 are equally spaced upon the bars 1 between the uprights 4 and 7.

The uprights 4 and 5 are of an equal height and have the upper ends thereof pivotally connected by links 8, the pivot connection of the uprights 4 being formed by a longitudinal rod 9 extending from the upright 4 upon one side of the stand to the upright 4 upon the opposite side, this rod 9 serving functionally as a tray support, as will presently appear. The uprights 5 adjacent to the upper ends thereof are connected by a longitudinal rod 10, and this rod in conjunction with the rod 9 is adapted to support a fruit tray, comprising end plates 11 connected by rods 12 and a woven wire frame 13, said frame being shaped to form the bottom and the front and the rear walls of the tray and to support fruit and also shaped to provide two seats 14 for the rods 9 and 10, these rods supporting the tray at an inclination, whereby the contents of the tray can be easily observed. To permit of the trays being manually moved, the end plates 11 are provided with slots or hand grips 15.

The uprights 6 and 7 are stepped relative to the uprights 5, the uprights 6 being approximately two thirds the height of the uprights 5, while the uprights 7 are approximately half the height of the uprights 6. The upper ends of the uprights 6 are pivotally connected by links 16 to the uprights 5, the pivoted connection with said uprights 5 being effected by means of a longitudinal rod 17. The uprights 6 are connected by a longitudinal rod 18 adjacent to the upper ends thereof, this rod and the rod 17 also being adapted to support a tray of the same form and in the same manner as the tray supported on rods 9, 10, and above described.

The upper ends of the uprights 7 are pivotally connected to the uprights 6 by side links 19, said links being also pivotally connected, as at 20, to the uprights 4 and 5. The pivoted connection of the links 19 with the uprights 6 is effected by a longitudinal rod 21, and this rod together with a rod 22 arranged between the uprights 7 serves for supporting a third tray in the manner aforedescribed.

The uprights 4 are connected together by diagonally disposed tie rods 23, these tie rods bracing said uprights and providing a rigid structure when the stand is set up for use. To lock the stand in a set-up position pivoted arms 24 are used, these arms being pivotally mounted at one end upon the longitudinal rod 2 at the front of the stand, and notched as at 25, to engage inwardly projecting pins 26 carried by the uprights 5. In providing the arms 24 with a plurality of notches, the uprights 4, 5, 6 and 7 can be positioned at an inclination relative to the end rails 1, for the purpose heretofore mentioned.

When the stand is to be folded, the fruit trays are removed and the arms 24 disengaged from the pins 27, permitting of the uprights being collapsed to the position shown in Fig. 4 of the drawings. The stand can then be set upon its edge to occupy a comparatively small space in a store.

The stand is made of light and durable metal and by increasing the size of the casters 3, and providing the rails 1 with large wheels, the stand can be used for vending fruit about the streets.

A multiplicity of uprights and connecting rods can be provided for supporting a larger number of fruit trays of smaller size on a base approximately the same area as the stand shown and described, therefore I do not care to confine myself to the specific arrangement of the elements of my invention as described and desire it to be understood that various changes can be made in the details of construction without departing from the spirit of the invention.

Having now described my invention what I claim as new, is:—

1. A folding fruit stand comprising end rails, casters carried by said end rails, longitudinal rods connecting said end rails, uprights pivotally connected to said end rails, longitudinal rods connecting said uprights and providing tray supports, links connecting the upper ends of said uprights, trays mounted upon said rods and having seats for said rods adapted to support said trays at an inclination, arms pivotally connected to the forward ends of said rails, inwardly projecting pins carried by two of said uprights and adapted to be engaged by the free ends of said arms, and tie rods connecting two of said uprights for bracing the same, substantially as described.

2. A fruit stand comprising movable end rails, uprights pivotally connected to said rails, links pivotally connecting said uprights together, longitudinal rods connecting said uprights, trays detachably mounted upon said rods and having seats for said rods to support said trays at an inclination, and pivoted arms carried by said rails and connecting with two of said uprights for maintaining said uprights in a vertical position.

In testimony whereof I affix my signature in the presence of two witnesses.

JOHN H. SABO.

Witnesses:
 MAX H. SROLOVITZ,
 C. V. BROOKS.